United States Patent [19]

Nonoyama et al.

[11] Patent Number: 5,646,924
[45] Date of Patent: Jul. 8, 1997

[54] RECORDING AND SIMULTANEOUS VERIFYING METHOD OF PHASE-CHANGING TYPE OF INFORMATION RECORDING MEDIUM

[75] Inventors: Osamu Nonoyama, Yokohama; Yukio Ide, Mishima; Makoto Harigaya, Hiratsuka; Yoshiyuki Kageyama; Hiroshi Deguchi, both of Yokohama; Katsuyuki Yamada, Mishima; Masaetsu Takahashi, Yokohama; Hiroko Iwasaki, Tokyo, all of Japan

[73] Assignee: Ricoh Company, Ltd., Tokyo, Japan

[21] Appl. No.: 252,732

[22] Filed: Jun. 2, 1994

[30] Foreign Application Priority Data

Jun. 7, 1993 [JP] Japan .................................. 5-135539

[51] Int. Cl.⁶ .................................................. G11B 7/00
[52] U.S. Cl. ........................... 369/58; 369/116; 369/54; 369/275.1
[58] Field of Search ............................... 369/32, 48, 54, 369/58, 116, 112, 124, 275.1, 44.37, 59, 110

[56] References Cited

U.S. PATENT DOCUMENTS

| | | | |
|---|---|---|---|
| 4,599,717 | 7/1986 | Bracht et al. | 369/32 |
| 4,694,447 | 9/1987 | Cohen et al. | 369/112 |
| 4,816,385 | 3/1989 | Gravesteijn et al. | 430/495 |
| 4,831,611 | 5/1989 | Sasaki et al. | 369/54 |
| 4,847,132 | 7/1989 | Takao et al. | 428/64 |
| 4,889,746 | 12/1989 | Utsumi et al. | 427/162 |
| 4,904,577 | 2/1990 | Tyan et al. | 430/495 |
| 4,947,372 | 8/1990 | Koshino et al. | 365/106 |
| 4,954,379 | 9/1990 | Nishida et al. | 428/64 |
| 5,011,723 | 4/1991 | Harigaya et al. | 428/64 |
| 5,015,548 | 5/1991 | Pan et al. | 430/19 |
| 5,063,097 | 11/1991 | Hirota et al. | 428/65 |

(List continued on next page.)

FOREIGN PATENT DOCUMENTS

| | | |
|---|---|---|
| 0184452 | 6/1986 | European Pat. Off. . |
| 0314859 | 5/1989 | European Pat. Off. . |
| 61-92459 | 5/1986 | Japan . |

OTHER PUBLICATIONS

Patent Abstracts of Japan, Publication No. JP3197173, Publication date Aug. 28, 1991.
Patent Abstracts of Japan, Publication No. JP4094965, Publication date Mar. 27, 1992.
Derwent Patent Abstract, Publication No. JP3240590, Publication dated Oct. 25, 1991.
Derwent Patent Abstract, Publication No. JP4078031, Publication dated Mar. 12, 1992.
Derwent Patent Abstract, Publication No. JP4232779, Publication dated Aug. 21, 1992.
Patent Abstract of Japan, Publication No. JP1251332, Publication dated Jun. 10, 1989.
Patent Abstracts of Japan, Publication No. JP1112538, Publication dated Jan. 5, 1989.

*Primary Examiner*—Nabil Hindi
*Attorney, Agent, or Firm*—Cooper & Dunham LLP

[57] ABSTRACT

An intensity of light reflected on a phase-changing type of information recording medium is changed since unrecorded and recorded portions of the recording medium have different phase states so that reflectivities of the unrecorded and recorded portions are different from each other. Such an intensity change takes place in a very short time immediately after a recording pulse is irradiated onto the phase-changing type of information recording medium. In a recording and simultaneous verifying method of the phase-changing type of information recording medium, the change in intensity of light reflected on the phase-changing type of information recording medium is detected by using this light reflected simultaneously with a recording pulse irradiated onto the phase-changing type of information recording medium. It is confirmed if the information is correctly recorded by detecting the reflected light. Thus, this information can be recorded to the information recording medium and can be simultaneously verified.

12 Claims, 3 Drawing Sheets

U.S. PATENT DOCUMENTS

| | | | |
|---|---|---|---|
| 5,080,947 | 1/1992 | Yamada et al. | 428/64 |
| 5,095,479 | 3/1992 | Harigaya et al. | 369/288 |
| 5,124,232 | 6/1992 | Nakanishi et al. | 430/270 |
| 5,156,693 | 10/1992 | Ide et al. | 148/403 |
| 5,208,792 | 5/1993 | Imanaka | 369/32 |
| 5,298,305 | 3/1994 | Shinozuka et al. | 428/64 |
| 5,341,359 | 8/1994 | Birukawa et al. | 369/54 |
| 5,404,348 | 4/1995 | Terao et al. | 369/116 |
| 5,428,586 | 6/1995 | Kobayashi et al. | 369/110 | ium.

RECORDING AND SIMULTANEOUS VERIFYING METHOD OF PHASE-CHANGING TYPE OF INFORMATION RECORDING MEDIUM

BACKGROUND OF THE INVENTION

1. Field of the Invention

The present invention relates to a recording and simultaneous verifying method of a phase-changing type off information recording medium in which this method is utilized in fields of devices relative to an optical memory, etc., and information can be recorded, regenerated and rewritten by changing a phase of the material of a recording layer by irradiating an optical beam onto the information recording medium.

2. Description of the Related Art

A so-called phase-changing type of information recording medium is well known as one of optical memory media in which information can be recorded, regenerated and erased by irradiating an electromagnetic wave, especially, a laser beam to this recording medium. This phase-changing type of information recording medium uses a transition between a crystal phase and a noncrystal phase, or a transition between crystal phases. It is difficult to overwrite information by a single beam in the case of a magneto-optic memory. However, in accordance with this phase-changing type of information recording medium, information can be especially overwritten by a single beam. Further, the construction of an optical system on a driving side of the phase-changing type of information recording medium is simplified in comparison with the magneto-optic memory. Therefore, the phase-changing type of information recording medium has recently been searched and developed actively.

For example, U.S. Pat. No. 3,530,441 shows a typical example of such a phase-changing type of information recording medium. In this United States Patent, the phase-changing type of information recording medium uses a so-called chalcogen alloy material such as Ge-Te, Ge-Te-Sn, Ge-Te-S, Ge-Se-S, Ge-Se-Sb, Ge-As-Se, In-Te, Se-Te, Se-As, etc. In Japanese Patent Application Laying Open (KOKAI) No. 61-219692, gold (Au) is added to a Ge-Te including material to improve stability of the recording medium and crystallize the recording medium at a high speed. etc. In Japanese Patent Application Laying Open (KOKAI) No. 61-270190, tin (Sn) and gold (Au) are added to the chalcogen alloy material. In Japanese Patent Application Laying Open (KOKAI) No. 62-19490, palladium (Pd) is added to the chalcogen alloy material. Further, in Japanese Patent Application Laying Open (KOKAI) No. 62-73438, a composition ratio of Ge-Te-Se-Sb and Ge-Te-Sb in the chalcogen alloy material is specified to improve cyclability of data recording and erasing operations.

However, all recording characteristics required for the phase-changing type of information recording medium are not satisfied in each of these publications. In particular, the most important subjects to be solved are to prevent an erasing ratio of data from being reduced by an incomplete erasing operation at an overwriting, and to increase the number off cyclability of overwriting.

Japanese Patent Application Laying Open (KOKAI) No. 63-251290 proposes a phase-changing type of information recording medium having a recording layer composed of a single phase off compound whose crystal state is substantially equal to a ternary compound or more. In this kind of recording layer, a ternary compound such as $In_3SbTe_2$, etc. having a stoichiometric composition exists at a ratio of 90 molecular percent (%) or more. By using such a recording layer, recording and erasing characteristics of the recording medium is improved. However, an erasure ratio still remains low.

In consideration of these situations, it is desirable to develop a phase-changing type of information recording medium having a high data erasure ratio and an excellent cyclability.

Materials for a protective layer suitable for a material of the recording layer have been also developed. For example, $ZnSSiO_2$, $Al_2O_3$, $Ta_2O_5$, $SiN$, $AlN$, etc. are used as the protective layer. However, all characteristics of the recording medium required for an optical memory medium are not satisfied at present even with these materials.

Generally, in the magneto-optic memory, it is necessary to perform three operations composed of erasing, recording and verifying data. In this case, accordingly, three rotations of the disk are required. Therefore, a data writing speed is apparently low in comparison with a magnetic disk that requires two operations composed of recording and verifying data. In this case, which is represented by hard disk, two rotations or less of the disk are normally required. For the phase-changing type of information recording medium, two operations composed of recording and verifying are also required with existing technology. This is a great obstacle to a reduction of the data writing speed. Concretely, the data writing speed is two or three times slower than that in the magnetic disk, which leads to a low data transfer rate.

SUMMARY OF THE INVENTION

It is therefore an object of the present invention to provide a method for recording and simultaneous verifying information to a phase-changing type of information recording medium.

In accordance with a first construction of the present invention, the above object can be achieved by a recording and simultaneous verifying method, comprising the steps of detecting a change in intensity of light reflected on the phase-changing type of information recording medium by using this light reflected simultaneously with a recording pulse irradiated onto the phase-changing type of information recording medium, and confirming if the information is correctly recorded by detecting the reflected light.

In accordance with a second construction of the present invention, a change in optical constant of a recording layer caused at an irradiating of an electromagnetic wave is used to record the information onto the phase-changing type of information recording medium. In accordance with a third construction of the present invention, the phase-changing type of information recording medium has a recording layer composed of Ag, In, Sb and Te, a protective layer and a reflective heat-radiating layer which are formed on a substrate. In accordance with a fourth construction of the present invention, the phase-changing type of information recording medium has a recording layer composed of Ag, In, Sb and Te, a protective layer and a reflective heat-radiating layer which are formed on a substrate, and the main composition and chemical structure of the recording material in a stable state thereof are represented by

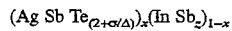

$$(Ag\, Sb\, Te_{(2+\alpha/\Delta)})_x (In\, Sb_2)_{1-x}$$

where
$0.4 \leq x \leq 0.55$
$0.5 \leq z \leq 2.5$ $-0.15 \leq \sigma \leq 0.1$ $\Delta = (1-\sigma)x/\{1+3x+z(1-x)\}$ In another construction, the phase-changing type of information recording medium may have a recording layer composed of Ag, In, Sb and Te, a protective layer and a reflective heat-radiating layer which are formed on a substrate. A change in optical constant of the recording layer caused at an irradiation of an electromagnetic wave is used to record the information onto the phase-changing type of information recording medium. Further, the phase-changing type of information recording medium may have a recording layer composed of Ag, In, Sb and Te, a protective layer and a reflective heat-radiating layer which are formed on a substrate, and the main composition and chemical structure of the recording material in a stable state thereof are represented by the above formula. In accordance with a fifth construction of the present invention, a change in intensity of light reflected on the recording layer is detected by using this reflected light when a constant delay time has passed since irradiation of a recording pulse onto the phase-changing type of information recording medium was started. It can be confirmed by detecting the reflected light if the information is correctly recorded to the phase-changing type of information recording medium.

In another construction, a change in optical constant of a recording layer caused at an irradiating of an electromagnetic wave is used to record the information onto the phase-changing type of information recording medium. The phase-changing type of information recording medium may have a recording layer composed of Ag, In, Sb and Te, a protective layer and a reflective heat-radiating layer which are formed on a substrate. Further, the phase-changing type of information recording medium may have a recording layer composed of Ag, In, Sb and Te, a protective layer and a reflective heat-radiating layer which are formed on a substrate, and the main composition and chemical structure of the recording material in a stable state thereof are represented by the above formula. In accordance with a fourteenth construction of the present invention, a recording multipulse is irradiated onto the phase-changing type of information recording medium. An intensity off light reflected on the phase-changing type of information recording medium is changed simultaneously when this recording multipulse is irradiated onto the phase-changing type of information recording medium. The change in the intensity of the reflected light is detected when the recording pulse at a bias level is irradiated onto the phase-changing type of information recording medium. It can be confirmed by detecting the reflected light if information is correctly recorded to the phase-changing type of information recording medium.

In accordance with a sixth construction of the present invention, the change in intensity of the reflected light is detected in the change of voltage level of an RF sum signal obtained from the phase-changing type of information recording medium. In accordance with a seventh construction of the present invention, an information indicative of a degree of a change in reflectivity between before and after a data recording is recorded in advance to a specified region of the phase-changing type of information recording medium. The change in intensity of the reflected light is detected in the change of voltage level of an RF sum signal obtained from the phase-changing type of information recording medium with reference to this information. In accordance with an eighth construction of the present invention, a degree of a change in reflectivity between before and after a data recording is detected in advance in a testing region of the phase-changing type of information recording medium. The change in intensity of the reflected light is detected in the change of voltage level of an RF sum signal obtained from the phase-changing type of information recording medium with reference to information of this detected degree.

In these sixth to eighth constructions, a series of recording pulses irradiated to the phase-changing type of information recording medium is set to a single pulse series or a multipulse series.

In the present invention, an optical constant of the recording layer of the phase-changing type of information recording medium is basically changed when an electromagnetic wave is irradiated onto the phase-changing type of information recording medium. Accordingly, the intensity of the light reflected on the phase-changing type of information recording medium is changed simultaneously when the electromagnetic wave is irradiated onto the phase-changing type of information recording medium. This intensity change is detected by the reflected light. Thus, it is possible to record information to the phase-changing type of information recording medium and simultaneously verify this information. Further, the recording speed of this information is improved even with the verifying pass. For example, an output voltage level of the RF sum signal obtained from the reflectance of the phase-changing type of information recording medium is changed since an unrecorded portion is in a crystal state and a recorded portion is in an amorphous state so that reflectivities of the unrecorded and recorded portions are different from each other. Such a change in reflectivity takes place in a very short time while a recording pulse is irradiated onto the phase-changing type of information recording medium, or after the recording pulse is completely irradiated onto the phase-changing type of information recording medium, since the phase-changing of the recording layer between a crystal state and an amorphous state takes place in about 100 nanoseconds (nsec) or less. Accordingly, information can be recorded to the phase-changing type of information recording medium and can be simultaneously verified by detecting the intensity of the reflected light immediately after the recording pulse is irradiated onto the phase-changing type of information recording medium.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a recording and simultaneous verifying method of a phase-changing type of information recording medium will next be described in detail with reference to the accompanying drawings.

Figure 1:
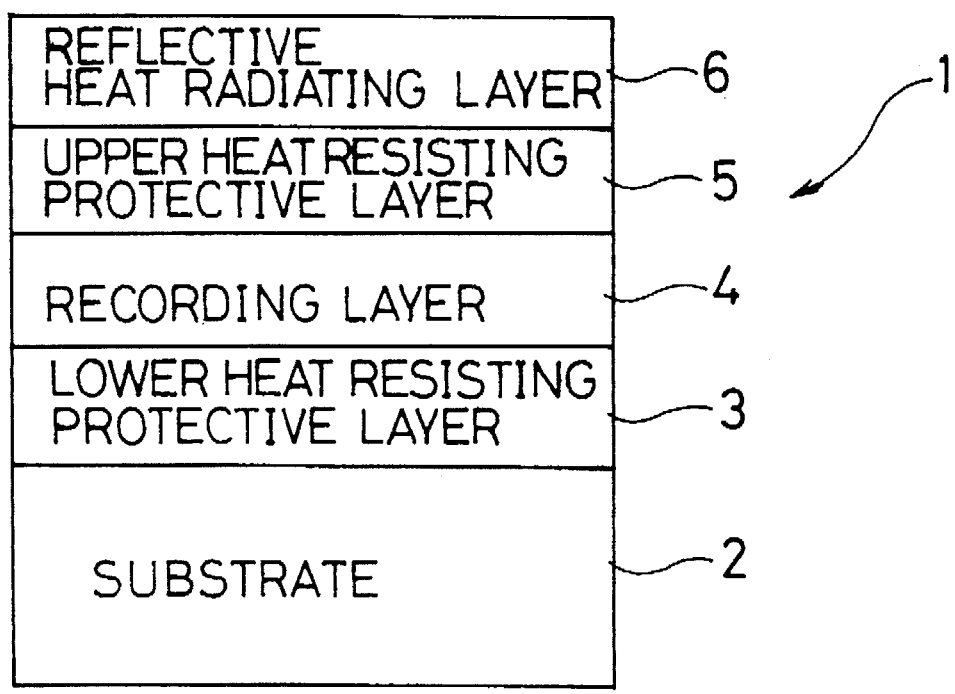
FIG. 1 is a view showing a typical structure of a phase-changing type of information recording medium in accordance with one embodiment of the present invention.

As shown in FIG. 1, a phase-changing type of information recording medium 1 used in an embodiment of the present invention is constructed by a layered structure in which a lower heat-resisting protective layer 3, a recording layer 4, an upper heat-resisting protective layer 5 and a reflective heat-radiating layer 6 are laminated with each other on a substrate 2. It is not necessary to arrange the heat-resisting protective layers 3 and 5 on both sides of the recording layer 4 at any time. However, it is preferable to form at least the lower heat-resisting protective layer 3 when the substrate 2 is constructed by a material having a low heat-resisting property such as polycarbonate resin.

An optical constant of the recording layer 4 is changed when an electromagnetic wave is irradiated to the recording layer 4. The recording layer 4 is preferably constructed by a phase-changing type of material. In particular, the recording layer 4 preferably includes Ag, In, Sb and Te as a medium constructional element thereof. More preferably, the main composition and chemical structure of these constructional elements in a stable state are represented by the following formula.

Here, $0.4 \leq x \leq 0.55$ $0.5 \leq z \leq 2.5$ $-0.15 \leq \sigma \leq 0.1$ $\Delta = (1-\sigma)x/\{1+3x+z(1-x)\}$ Further, the recording layer 4 preferably has $AgSbTe_2$ microcrystal having a stoichiometric composition or a composition close to this stoichiometric composition when data are erased from the recording medium or in unrecorded portion.

Such a recording layer 4 is formed by various kinds of gaseous phase growing methods such as a vacuum evaporation method, a sputtering method, a plasma CVD method, an optical CVD method, an ion plating method, an electronic beam evaporation method, etc. Besides the recording layer 4 can be also formed by a wet type processing method such as a sol gel method. The recording layer 4 has a thickness of from 100 to 10000 Å and preferably has a thickness of from 200 to 2000 Å. When the recording layer 4 is thinner than 100 Å, light absorption performance of the recording layer 4 is greatly reduced so that no recording layer 4 functions as a layer for recording data. In contrast to this, when the recording layer 4 is thicker than 10000 Å, no uniform phase change is easily caused at a high speed.

The upper heat-resisting protective layer 5 arranged between the recording layer 4 and the reflective heat-radiating layer 6 is suitably constructed by an oxide such as $SiO_2$, SiO, ZnO, $Al_2O_3$, etc., a sulfide such as $Si_3N_4$, AlN, BN, etc., or a mixture of these oxide and sulfide. In particular, the upper heat-resisting protective layer 5 is preferably constructed by a material having a thermal conductivity equal to or greater than 1 W/cmk such as AlN, BN, SiC, etc. This is because a change in state of the recording layer 4 can be increased if the upper heat-resisting protective layer 5 can be rapidly cooled. For example, such an upper heat-resisting protective layer 5 may be formed by various kinds of gaseous phase growing methods such as a vacuum evaporation method, a sputtering method, a plasma CVD method, an optical CVD method, an ion plating method, an electronic beam evaporation method, etc. The upper heat-resisting protective layer 5 has a thickness of from 100 to 5000 Å and preferably has a thickness of from 200 to 2000 Å. When the upper heat-resisting protective layer 5 is thinner than 100 Å, no upper heat-resisting protective layer 5 functions as a protective layer having a heat-resisting property. Conversely, when the upper heat-resisting protective layer 5 is thicker than 5000 Å, sensitivity of the phase-changing type of information recording medium is reduced and interfacial faces of the upper heat-resisting protective layer 5 tend to be easily separated from each other. The upper heat-resisting protective layer 5 may be constructed by multiple layers in accordance with necessity.

The reflective heat-radiating layer 6 may be formed by using a metallic material such as Al, Ag, Au, or an alloy of these metals, etc. No reflective heat-radiating layer 6 is required at any time. However, it is preferable to form the reflective heat-radiating layer 6 so as to reduce a thermal load of a disk on a side of the substrate 2 by radiating excessive heat from the recording medium. For example, such a reflective heat-radiating layer 6 may be formed by various kinds of gaseous phase growing methods such as a vacuum evaporation method, a sputtering method, a plasma CVD method, an optical CVD method, an ion plating method, an electronic beam evaporation method, etc. The reflective heat-radiating layer 6 has a thickness of from 100 to 3000 Å and preferably has a thickness of from 500 to 2000 Å. When the reflective heat-radiating layer 6 is thinner than 100 Å, no reflective heat-radiating layer 6 functions as a reflective layer for radiating heat from the recording medium. Conversely, when the reflective heat-radiating layer 6 is thicker than 2000 Å, sensitivity of the phase-changing type of information recording medium is reduced and interfacial faces of the reflective heat-radiating layer 6 tend to be easily separated from each other.

Glass, ceramics or resin can be normally used as a material of the substrate 2. However, the material of the substrate 2 is preferably made of resin in consideration of molding and cost. Such resin can be constructed by polycarbonate resin, acrylic resin, epoxy resin, polystyrene resin, acrylonitrile-styrene copolymer resin, polyethylene resin, polypropylene resin, silicon resin, fluororesin, ABS resin, urethane resin, etc. The material of the substrate 2 is preferably constructed by polycarbonate resin and acrylic resin in consideration of processing and optical characteristics, etc. The substrate may be formed in the shape of a disk, a card or a sheet.

An electromagnetic wave used to record, regenerate and erase data from the phase-changing type of information recording medium 1 can be constructed by using a laser beam, an electron beam, an X-ray, an ultraviolet ray, a visible ray, an infrared ray, a microwave, etc. A compact semiconductor laser is most suitable for a device for irradiating the electromagnetic wave to the recording medium 1 in consideration of attachment to a drive unit for rotating the recording medium 1.

A laser beam irradiating method using an argon laser or a semiconductor laser is used as a method for initializing the phase-changing type of information recording medium 1. In the case of the argon laser, power of the argon laser is preferably ranged from 300 mW to 2 W and a linear velocity of the disk is preferably ranged from 1.2 to 10 m/s and a feed speed of the laser is preferably ranged from 1 to 20 um per rotation. In the case of the semiconductor laser, power of the semiconductor laser is preferably ranged from 5 to 20 mW and a linear velocity of the disk is preferably ranged from 1.2 to 10 m/s.

Figure 2:
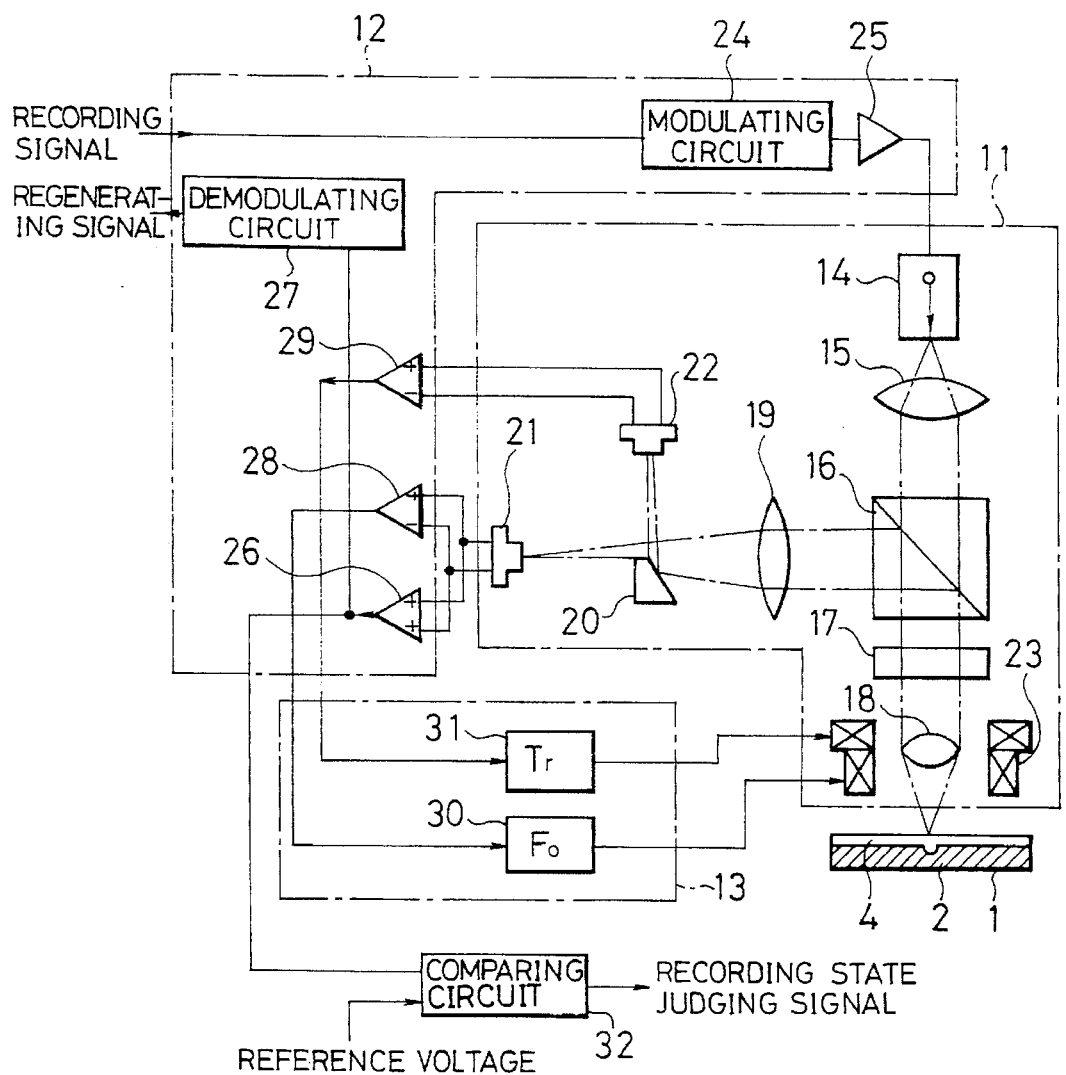
FIG. 2 is a block diagram showing the construction of a drive unit for rotating the phase-changing type of information recording medium; and each of FIGS. 3a and 3b is a timing chart showing a recording pulse.

For example, a drive unit for rotating the phase-changing type of information recording medium 1 in this embodiment is constructed as shown in FIG. 2. This drive unit is schematically constructed by an optical pickup 11, a signal processing system 12 and a pickup control system 13. The optical pickup 11 is constructed by a semiconductor laser 14, a coupling lens 15, a beam splitter 16, a ¼ wavelength plate 17, an objective lens 18, a condenser lens 19 and two-divisional light receiving elements 21 and 22. The coupling lens 15 changes a laser beam emitted from the semiconductor laser 14 to a parallel light beam. The beam splitter 16 separates the parallel light beam into two light beams. The condenser lens 19 receives light reflected on the phase-changing type of information recording medium 1 through the objective lens 18, the ¼ wavelength plate 17 and the beam splitter 16. Each of the two-divisional light receiving elements 21 and 22 receives a light beam from this condenser lens 19 through a knife edge prism 20. The above construction of the optical pickup 11 is well known. The objective lens 18 can be displaced by driving an actuator 23 for tracking and focusing.

The signal processing system 12 has a driving system for performing the modulating operation of a modulating circuit 24 based on a recording signal and operating the semiconductor laser 14 through a laser driving circuit 25. The signal processing system 12 also has an arithmetic unit 26 for carrying out a logical sum of RF signals obtained from both output terminals of the two-divisional light receiving element 21. An RF sum signal from this arithmetic unit 26 is provided as a regenerating signal through a demodulating circuit 27. The signal processing system 12 also has an arithmetic unit 28 for calculating a difference between the RE signals of both the output terminals of the two-divisional light receiving element 21. A difference signal from this arithmetic unit 28 is obtained as a focusing error signal. Similarly, an arithmetic unit 29 is arranged to calculate a difference between signals of both output terminals of the two-divisional light receiving element 22. A difference signal from this arithmetic unit 29 is obtained as a tracking error signal.

The pickup control system 13 has a focusing driving circuit (Fo) 30 and a tracking driving circuit (Tr) 31. The focusing driving circuit 30 performs a focusing operation of the drive unit by displacing a focusing member of the actuator 23 based on the focusing error signal obtained from the arithmetic unit 28. The tracking driving circuit 31 performs a tracking operation of the drive unit by displacing a tracking member of the actuator 23 based on the tracking error signal obtained from the arithmetic unit 29.

In addition to this basic construction, the drive unit in this embodiment has a comparing circuit 32 for detecting a change in voltage level of the RF sum signal obtained from the arithmetic unit 26 by comparing a voltage of this RF sum signal with a predetermined reference voltage. This comparing circuit 32 provides a recording state judging signal for judging a recording state of data or information based on operations for recording and simultaneously verifying this information.

In such a construction, the phase-changing type of information recording medium in this embodiment is constructed as one concrete example as follows. First, the substrate 2 is made of polycarbonate resin and has a thickness of 1.2 mm. The substrate 2 has a groove having a depth of about 700 Å and having a pitch of about 1.6 μm. The substrate 2 has a diameter of 120 mm. A protective layer of $ZnSSiO_2$ as a lower heat-resisting protective layer 8, a recording layer 4 of Ag-In-Sb-Te, an AlN protective layer as an upper heat-resisting protective layer 5, an Ag reflecting layer as a reflective heat-radiating layer 6 are sequentially laminated with each other on the substrate 2 by an RF sputtering method so that an optical disk is manufactured as a phase-changing type of information recording medium 1. In this case, the $ZnSSiO_2$ protective layer as the lower heat-resisting protective layer 3 has a thickness of 2000 Å. The recording layer 4 has a composition ratio of Ag:In:Sb:Te= 12:13:51:24 and has a thickness of 200 Å. The AlN protective layer as the upper heat-resisting protective layer 5 has a thickness of 300 Å. The Ag reflecting layer as the reflective heat-radiating layer 6 has a thickness of 700 Å. The optical disk is initialized by irradiating a laser beam of a semiconductor laser onto this optical disk. In this case, laser power is set to 10 mW and a linear velocity of the optical disk is set to 1.3 m/s.

Figure 3A:
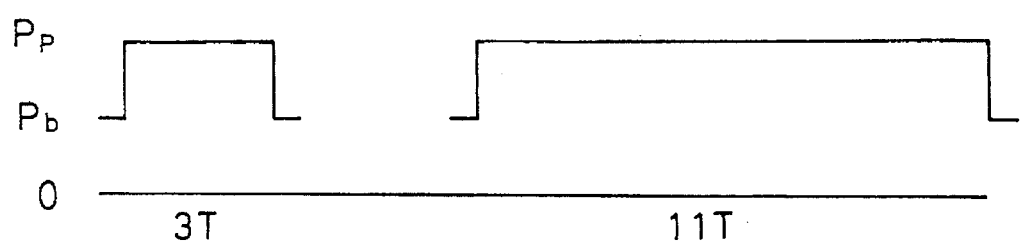

An EFM signal is recorded onto the optical disk manufactured above by irradiating a recording pulse onto the optical disk by the laser beam. In this case, a recording pulse series irradiated onto the optical disk is provided by using one pulse system (a single pulse system) as shown in FIG. 3a. At this time, output voltage levels of an RF sum signal in unrecorded and recorded portions of the optical disk are changed. This is generally because the unrecorded portion is in a crystal state and the recorded portion is in an amorphous state in a phase changing record. Namely, reflectivities of the unrecorded and recorded portions in the crystal and amorphous states are different from each other so that reflectivities of the recording layer are changed by recording information onto the optical disk. This change in reflectivity is caused for a very short, time after a recording pulse is completely irradiated onto the optical disk. An intensity of light reflected on the optical disk manufactured above and corresponding to the RF sum signal is detected after the recording pulse is completely irradiated onto the optical disk. IF an intensity level of this reflected light is lower than a preset intensity level of the reflected light in the unrecorded portion corresponding to a reference voltage, it is possible to instantly confirm that information is correctly recorded onto the optical disk. Thus, a verifying operation of this information is performed.

Figure 3B:
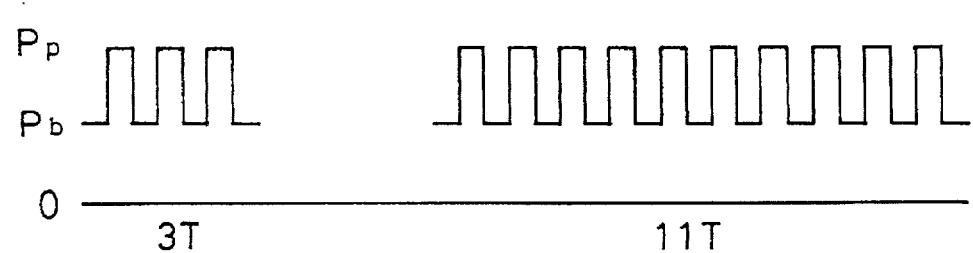

In the above concrete example, a pulse system of the recording pulse series irradiated onto the optical disk is not limited to one pulse system, but may be set to e.g., a multipulse series system as shown in FIG. 3b. This multipulse series system is a two stage system for changing laser power every unit period between a peak intensity level Pp and a bias intensity level Pb. A change in intensity level of reflected light at an irradiating time thereof at the bias level Pb located between irradiations of the reflected light at peak levels Pp of respective recording pulses is detected through the comparing circuit 32 as mentioned above in a detecting operation of this information immediately after this information has been recorded onto the optical disk. In this case, it is possible to confirm whether or not this information is correctly recorded onto the optical disk.

The RF sum signal is compared with the reference voltage as a method for detecting a change in intensity level of the reflected light immediately after information has been recorded onto the phase-changing type of information recording medium 1. However, an information indicative of a degree of a reflectivity change between before and after the information recording may be recorded in advance to a specified region of the phase-changing type of information recording medium 1. In this case, a normal writing operation of this information is confirmed by detecting the change in intensity level of the reflected light with reference to this information. Otherwise, a degree of the reflectivity change between before and after the information recording may be detected in advance in a testing region of the phase-changing type of information recording medium 1. In this case, the normal writing operation of this information is confirmed by detecting the change in intensity level of the reflected light with reference to information of this detected degree.

As mentioned above, in accordance with a first construction of the present invention, the above object can be achieved by a recording and simultaneous verifying method of a phase-changing type of information recording medium comprising the steps of detecting a change in intensity of light reflected on the phase-changing type of information recording medium by using this light reflected simultaneously with a recording pulse irradiated onto the phase-changing type of information recording medium, and confirming if the information is correctly recorded by detecting the reflected light.

In accordance with a second construction of the present invention, a change in optical constant of a recording layer caused at an irradiating of an electromagnetic wave is used to record the information onto the phase-changing type of information recording medium. In accordance with a third construction of the present invention, the phase-changing type of information recording medium has a recording layer composed of Ag, In, Sb and Te, a protective layer and a reflective heat-radiating layer which are formed on a substrate. In accordance with a fourth construction of the present invention, the phase-changing type of information recording medium has a recording layer composed of Ag, In, Sb and Te, a protective layer and a reflective heat-radiating layer which are formed on a substrate, and the main composition and chemical structure of the recording material in a stable state thereof are represented by $$(Ag\ Sb\ Te_{(2+\sigma/\Delta)})_x (In\ Sb_z)_{1-x}$$

where $0.4 \leq x \leq 0.55$ $0.5 \leq z \leq 2.5$ $-0.15 \leq \sigma \leq 0.1$ $\Delta = (1-\sigma)x/\{1+3x+z(1-x)\}$ In another construction, the phase-changing type of information recording medium may have a recording layer composed of Ag, In, Sb and Te, a protective layer and a reflective heat-radiating layer which are formed on a substrate. A change in optical constant of the recording layer caused at an irradiation of an electromagnetic wave is used to record the information onto the phase-changing type of information recording medium. Further, the phase-changing type of information recording medium may have a recording layer composed of Ag, In, Sb and Te, a protective layer and a reflective heat-radiating layer which are formed on a substrate, and the main composition and chemical structure of the recording material in a stable state thereof are represented by the above formula. In accordance with a fifth construction of the present invention, a change in intensity of light reflected on the recording layer is detected by using this reflected light when a constant delay time has passed since irradiation of a recording pulse onto the phase-changing type of information recording medium was started. It can be confirmed by detecting the reflected light if the information is correctly recorded to the phase-changing type of information recording medium.

In another construction, a change in optical constant of a recording layer caused at an irradiating of an electromagnetic wave is used to record the information onto the phase-changing type of information recording medium. The phase-changing type of information recording medium may have a recording layer composed of Ag, In, Sb and Te, a protective layer and a reflective heat-radiating layer which are formed on a substrate. Further, the phase-changing type of information recording medium may have a recording layer composed of Ag, In, Sb and Te, a protective layer and a reflective heat-radiating layer which are formed on a substrate, and the main composition and chemical structure of the recording layer in a stable state thereof are represented by the above formula. In accordance with a fourteenth construction of the present invention, a recording multipulse is irradiated onto the phase-changing type of information recording medium. An intensity of light reflected on the phase-changing type of information recording medium is changed simultaneously when this recording multipulse is irradiated onto the phase-changing type of information recording medium. The change in the intensity of the reflected light is detected when the recording pulse at a bias level is irradiated onto the phase-changing type of information recording medium. It can be confirmed by detecting the reflected light if information is correctly recorded to the phase-changing type of information recording medium.

In accordance with a sixth construction of the present invention, the change in intensity of the reflected light is concretely detected in the change of voltage level of an RF sum signal obtained from the phase-changing type of information recording medium. In accordance with a seventh construction of the present invention, an information indicative of a degree of a change in reflectivity between before and after a data recording is recorded in advance to a specified region of the phase-changing type of information recording medium. The change in intensity of the reflected light is detected in the change of voltage level of an RF sum signal obtained from the phase-changing type of information recording medium with reference to this information. In accordance with an eighth construction of the present invention, a degree of a change in reflectivity between before and after a data recording is detected in advance in a testing region of the phase-changing type of information recording medium. The change in intensity of the reflected light is detected in the change of voltage level of an RF sum signal obtained from the phase-changing type of information recording medium with reference to information of this detected degree.

In these sixth to eighth constructions, a series of recording pulses irradiated to the phase-changing type of information recording medium is set to a single pulse series or a multipulse series.

In the present invention, an optical constant of the recording layer of the phase-changing type of information recording medium is basically changed when an electromagnetic wave is irradiated onto the phase-changing type of information recording medium. Accordingly, the intensity of the light reflected on the phase-changing type of information recording medium is changed simultaneously when the electromagnetic wave is irradiated onto the phase-changing type of information recording medium. This intensity change is detected by the reflected light. Thus, it is possible to record information to the phase-changing type of information recording medium and simultaneously verify this information. Further, the recording speed of this information is improved even with the verifying pass. Concretely, an output voltage level of the RF sum signal obtained from the reflectance of the phase-changing type of information recording medium is changed since an unrecorded portion is in a crystal state and a recorded portion is in an amorphous state so that reflectivities of the unrecorded and recorded portions are different from each other. Such a change in reflectivity takes place in a very short time after a recording pulse is completely irradiated onto the phase-changing type of information recording medium. Accordingly, information can be recorded to the phase-changing type of information recording medium and can be simultaneously verified by detecting the intensity of the reflected light immediately after the recording pulse is irradiated onto the phase-changing type of information recording medium.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording and simultaneous verifying method of a phase-changing type of information recording medium comprising the steps of:

irradiating a portion of a phase-changing type information recording medium with a beam of light to record information on said phase-changing type of information recording medium, said phase-changing type information recording medium having a recording layer composed of Ag, In, Sb and Te, a protective layer and a reflective heat-radiating layer which are formed on a substrate, wherein a main composition and chemical structure of said recording layer in a stable state thereof is represented by:

$$(Ag\ Sb\ Te_{(2+\sigma/\Delta)})_x\ (In\ Sb_2)_{1-x}$$

where $0.4 \leq x \leq 0.55$ $0.5 \leq z \leq 2.5$ $-0.15 \leq \sigma \leq 0.1$ $\Delta = (1-\sigma)x/\{1+3x+z(1-x)\}$, and wherein said phase-changing type information recording medium is changeable between a crystalline phase and a non-crystalline phase, and said beam of light includes at least one recording pulse representing the information to be recorded;

simultaneously measuring light reflected from said irradiated portion of said phase-changing type information recording medium; and confirming that said information is recorded on said phase-changing type recording medium by comparing an intensity level of said measured light to a preset intensity level.

2. A recording and simultaneous verifying method of a phase-changing type of information recording medium in which the phase-changing type of information recording medium has a recording layer composed of Ag, In, Sb and Te, a protective layer and a reflective heat-radiating layer which are formed on a substrate, and in which the phase-changing type of information medium changes between a crystalline phase and a non-crystalline phase, and in which the main composition and chemical structure of said recording layer in a stable state thereof are represented by $$(Ag\ Sb\ Te_{(2+\sigma/\Delta)})_x(In\ Sb_2)_{1-x}$$

where $0.4 \leq x \leq 0.55$ $0.5 \leq z \leq 2.5$ $-0.15 \leq \sigma \leq 0.1$ $\Delta = (1-\sigma)x/\{1+3x+z(1-x)\}$ the recording and simultaneous verifying method comprising the steps of:

irradiating a portion of a phase-changing type information recording medium with a beam of light to record information on said phase-changing type of information storage medium., said phase-changing type information recording medium being changeable between a crystalline phase and a non-crystalline phase, and said beam of light includes at least one recording pulse representing the information to be recorded;

simultaneously measuring light reflected from said irradiated portion of said phase-changing type information recording medium; and confirming that said information is recorded on said phase-changing type recording medium by comparing an intensity level of said measured light to a preset intensity level.

3. A recording and simultaneous verifying method of a phase-changing type of information recording medium as claimed in claim 2, wherein the change in intensity of the reflected light is detected by a change in voltage level of an RF sum signal obtained from the phase-changing type of information recording medium.

4. A recording and simultaneous verifying method of a phase-changing type of information recording medium as claimed in claim 2, wherein an information indicative of a degree of a change in reflectivity between before and after a data recording is recorded in advance to a specified region of the phase-changing type of information recording medium; and the change in intensity of the reflected light is detected by a change in voltage level of an RF sum signal obtained from said phase-changing type of information recording medium with reference to this information.

5. A recording and simultaneous verifying method of a phase-changing type of information recording medium as claimed in claim 2, wherein a degree of a change in reflectivity between before and after a data recording is detected in advance in a testing region of the phase-changing type of information recording medium; and the change in intensity of the reflected light is detected by a change in voltage level of an RF sum signal obtained from said phase-changing type of information recording medium with reference to information of this detected degree.

6. A recording and simultaneous verifying method of a phase-changing type of information recording medium as claimed in claim 3 wherein a series of recording pulses irradiated to the phase-changing type of information recording medium is set to a single pulse series.

7. A recording and simultaneous verifying method of a phase-changing type of information recording medium as claimed in claim 3 wherein a series of recording pulses irradiated to the phase-changing type of information recording medium is set to a multipulse series.

8. A recording and simultaneous verifying method of a phase-changing type of information recording medium in which the phase-changing type of information recording medium has a recording layer composed or Ag, In, S and Te, a protective layer and a reflective heat-radiating layer which are formed on a substrate, and in which the phase-changing type of information medium changes between a crystalline phase and a non-crystalline phase, and in which the main composition and chemical structure of said recording layer in a stable state thereof are represented by $$(Ag\ S\ Te_{(2+\sigma/\Delta)})_x(In\ S_2)_{1-x}$$

where $0.4 \leq x \leq 0.55$ $0.5 \leq z \leq 2.5$ $-0.15 \leq \sigma \leq 0.1$ $\Delta = (1-\sigma)x/\{1+3x+z(1-x)\}$ the recording and simultaneous verifying method comprising the steps of:

irradiating a recording multipulse onto the phase-changing type of information recording medium;

measuring an intensity of light reflected on the phase-changing type of information recording medium simultaneously when the recording multipulse is irradiated onto the phase-changing type of information recording medium;

the intensity of the reflected light being measured when the recording pulse is at a bias level between peak intensity levels of the respective recording pulse irradiated onto the phase-changing type of information recording medium; and confirming that said information is recorded to said phase-changing type of information recording medium by comparing the measured intensity of light to a preset intensity level.

9. A recording and simultaneous verifying method of a phase-changing type of information recording medium as claimed in claim 4 wherein a series of recording pulses irradiated to the phase-changing type of information recording medium is set to a single pulse series.

10. A recording and simultaneous verifying method of a phase-changing type of information recording medium as claimed in claim 5 wherein a series of recording pulses irradiated to the phase-changing type of information recording medium is set to a single pulse series.

11. A recording and simultaneous verifying method of a phase-changing type of information recording medium as claimed in claim 4 wherein a series of recording pulses irradiated to the phase-changing type of information recording medium is set to a multipulse series.

12. A recording and simultaneous verifying method of a phase-changing type of information recording medium as claimed in claim 5 wherein a series of recording pulses irradiated to the phase-changing type of information recording medium is set to a multipulse series.

\* \* \* \* \*